(12) United States Patent (10) Patent No.: US 8,738,438 B2
Ramsey et al. (45) Date of Patent: May 27, 2014

(54) METHOD, SYSTEM, AND PROGRAM PRODUCT FOR INCREASING THE EFFECTIVENESS OF CUSTOMER CONTACT STRATEGIES

(75) Inventors: Mark S. Ramsey, Kihei, HI (US); David A. Selby, Nr Fareham (GB); Stephen J. Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 2610 days.

(21) Appl. No.: 11/338,585

(22) Filed: Jan. 24, 2006

(65) Prior Publication Data

US 2007/0185764 A1 Aug. 9, 2007

(51) Int. Cl.
*G06Q 30/00* (2012.01)
(52) U.S. Cl.
USPC ..................... 705/14.41; 705/14.43
(58) Field of Classification Search
USPC ................. 705/10, 14, 14.41, 14.43; 707/100
See application file for complete search history.

(56) References Cited

U.S. PATENT DOCUMENTS

| | | | |
|---|---|---|---|
| 5,974,396 A * | 10/1999 | Anderson et al. ............... | 705/10 |
| 6,567,786 B1 | 5/2003 | Bibelnicks et al. | |
| 6,839,681 B1 * | 1/2005 | Hotz .............................. | 705/10 |
| 6,925,441 B1 | 8/2005 | Jones, III et al. | |
| 7,246,083 B2 * | 7/2007 | Bibelnieks et al. ........ | 705/14.43 |
| 7,349,865 B2 * | 3/2008 | Fergusson et al. ............. | 705/10 |
| 7,403,904 B2 * | 7/2008 | Abe et al. ......................... | 705/10 |
| 2002/0059283 A1 * | 5/2002 | Shapiro et al. ................ | 707/100 |
| 2003/0069787 A1 * | 4/2003 | Tendon et al. .................. | 705/14 |
| 2005/0209910 A1 | 9/2005 | Selby | |

FOREIGN PATENT DOCUMENTS

| | | |
|---|---|---|
| JP | 2001312629 A | 11/2001 |
| JP | 2002024692 A | 1/2002 |
| JP | 2002074129 A | 3/2002 |
| JP | 2002197259 A | 7/2002 |
| JP | 2003216867 A | 7/2003 |
| JP | 2004171151 A | 6/2004 |
| JP | 2005044253 A | 2/2005 |
| JP | 2005196777 A | 7/2005 |

OTHER PUBLICATIONS

Information for IDS for END920050161JP1 dated Mar. 28, 2012.
Michael P. Haydock, "Contact Optimization: Efficient Diversification of Customer Contacts", The International Journal of Applied Management and Technology, vol. 3, No. 1, pp. 119-158, May 2005.

* cited by examiner

*Primary Examiner* — John G Weiss
*Assistant Examiner* — Marilyn G Macasiano
(74) *Attorney, Agent, or Firm* — Matthew Chung; Hoffman Warnick LLC

(57) ABSTRACT

The invention provides a method, system, and program product for increasing the effectiveness of a customer contact strategy. In one embodiment, the method includes assigning a value to each of a plurality of customer events; assigning each of the plurality of promotion events to a "bucket" having a predefined range of values, based on a value of each promotion event; and selecting a customer event from the bucket having the highest range of values.

21 Claims, 6 Drawing Sheets

FIG. 1
PRIOR ART

|    | P-n | P-1 | P | P+1 | P+n |
|----|-----|-----|---|-----|-----|
| C1 | 1   | 1   | 0 | 1   | 0   |
| C2 | 0   | 0   | 1 | 1   | 1   |
| C3 | 1   | 0   | 0 | 0   | 1   |
| C4 | 1   | 1   | 1 | 0   | 1   |
| C5 | 0   | 0   | 0 | 0   | 0   |

FIG. 2
PRIOR ART

|     | P-n | P-1 | P  | P+1 | P+n |
|-----|-----|-----|----|-----|-----|
| P-n | -   | 20  | 10 | 0   | 0   |
| P-1 | 10  | -   | 50 | 40  | 0   |
| P   | 0   | 40  | -  | 50  | 0   |
| P+1 | 0   | 30  | 40 | -   | 10  |
| P+n | 0   | 0   | 0  | 0   | -   |

FIG. 3
PRIOR ART

|     | P | P+1 | P+2 | P+3 | P+n |
|-----|---|-----|-----|-----|-----|
| P   | 0 | 0   | 1   | 1   | 0   |
| P+1 | 0 | 0   | 1   | 0   | 1   |
| P+2 | 1 | 0   | 0   | 1   | 1   |
| P+3 | 0 | 1   | 0   | 0   | 1   |
| P+n | 1 | 1   | 1   | 0   | 0   |

METHOD, SYSTEM, AND PROGRAM PRODUCT FOR INCREASING THE EFFECTIVENESS OF CUSTOMER CONTACT STRATEGIES

BACKGROUND OF THE INVENTION

1. Technical Filed

The invention relates generally to marketing methods, and more particularly, to a method, system, and program product for increasing the effectiveness of customer contact strategies.

2. Background Art

Direct marketing involves advertising to customers at a location other than the point of sale. Catalogs, first-class mail, telemarketing, and e-mail are some examples of direct marketing techniques that are currently utilized to promote the sale of goods or services.

Increasingly, retail companies are adding direct marketing to their mix of marketing techniques. In addition, with the explosion of the Internet and e-commerce, consumers are presented with increasingly attractive alternatives to mail for the direct purchase of goods and services in their homes.

In response to these changes, direct marketers have responded in a variety of ways. Many direct marketers have improved their targeting of recipients of direct marketing through automation. For example, automation has been achieved by programming computers to perform sophisticated statistical analysis and modeling, develop marketing databases, increase the sophistication of their predictive models, or enhance their current processes with leading edge marketing tools such as data mining. While these efforts have helped reduce the negative impact of the changing marketing atmosphere, the industry has not been able to improve the average response rate to direct marketing.

A commonly-used marketing technique is called the RFM (Recency, Frequency and Monetary Value) technique. U.S. Pat. No. 6,925,441 B1 to Jones, III et al., incorporated herein by reference, discloses a computer-implemented targeted marketing system which evaluates many factors, including the RFM factors, to determine a customer list to be used for sending marketing materials in connection with a single proposed promotion event. The RFM technique is based on the theory that the customers that are most likely to respond to a proposed direct marketing event (e.g., a mailing of an offer) are those that have most recently been customers (Recency), and that have frequently been repeat customers (Frequency), and that have purchased significant dollar amounts (Monetary Value). Existing customers are scored based on their characteristics related to each of these three criteria, and a customer with a high RFM score is considered a good target for the proposed marketing event under analysis. Based on the RFM scores, a specialized customer list is generated for a single proposed marketing event.

More recently, U.S. Pat. No. 6,567,786 to Bibelnieks et al., which is hereby incorporated herein by reference, describes a system and method for increasing the effectiveness of customer contact strategies. More specifically, Bibelnieks et al. describe an approach that focuses on an individual customer rather than a particular promotion event.

For example, referring to FIG. 1, a matrix depicting the "horizontal marketing" approach of Bibelnieks et al. is shown. Individual customers or groups of customers, C1-C5, are shown in the first column and past, current, and future promotion events, P−n, P−1, P, P+1, P+n, are shown in the first row. A "1" indicates that the customer will be included in a particular promotion event and a "0" indicates that the customer will not be included in the promotion event, based on some predetermined value threshold. A value threshold may be global, or, more likely, will be specific to an individual promotion event and based, in part, on the costs associated with the event.

The decision of whether to include a particular customer or customer group in a promotion event is based on the expected value in including the customer or customer group in the event and the event's threshold. The Bibelnieks et al. approach calculates a value for each promotion event relative to each customer or customer group. While earlier approaches utilized a two-dimensional matrix expressed as V[customer, event], Bibelnieks et al. reduce this to an array expressed as V[customer * event]. Hereinafter, a promotion event applied to a particular customer or customer group is referred to as a customer event.

Under the Bibelnieks et al. approach, the decision whether to include a particular customer or customer group on a promotion event also considers the "cannibalistic" effect of one promotion event on another promotion event. This represents a significant improvement over earlier approaches. Referring to FIG. 2, a matrix depicting the "cannibalistic" effect of one promotion event on another is shown. Individual promotion events are shown in the first column and row. Accordingly, the main diagonal of the matrix plots a promotion event against itself and is therefore inapplicable. As shown, 40% of the value of promotion P would be cannibalized by promotion P+1. In turn, 50% of the value of promotion P+1 will be cannibalized by promotion P. Cannibalization may consider one or more of a merchandising component (i.e., the type of goods), a promotion-type component (e.g., promotions having similar incentives), and a time component (i.e., the time between promotions).

The Bibelnieks et al. approach also considers the "saturation" effect of one promotion event on another promotion event, relative to a particular customer. FIG. 3 shows a matrix of a "saturation" effect. A value of "1" indicates that the inclusion of the customer in the promotion event shown in the first column has no impact on the value of including the customer in the promotion event shown in the first row. For example, including a customer in promotion event P will have no impact on the value of also including that customer in promotion event P+2. Contrarily, a value of "0" indicates that once a customer has been included in the promotion event of the first column, there is no value in including that customer in the promotion event shown in the first row. For example, there is no value in including a customer in promotion event P+1 if that customer has previously been included in promotion event P. In some cases, a saturation effect is simply an extreme example of a cannibalistic effect (e.g., a very high or very low cannibalistic effect results in a "0" or a "1," respectively, in the matrix of FIG. 3). In other cases, the saturation effect may represent broader or narrower considerations relevant to a decision whether to include a customer in a promotion event. For example, where two promotion events involve identical merchandise, and that merchandise is generally an infrequent purchase (e.g., an automobile), the saturation effect is likely to be high (i.e., a "0" in the saturation matrix), even if the cannibalistic effect is relatively low (e.g., the promotion events do not overlap temporally).

Despite these improvements over earlier approaches, Bibelnieks et al. do not teach an efficient method for ensuring that the most valuable customer-specific promotion event is chosen. That is, upon the determination of the most valuable promotion event for a particular customer and inclusion of that customer in the promotion event, the Bibelnieks et al. approach requires a complete re-evaluation of the remaining promotion events, including the recalculation of their cannibalistic and saturation effects. This is computationally expensive to the point of being impractical when a large number of promotion events and/or customers must be evaluated.

To this extent, a need exists for a method for increasing the effectiveness of customer contact strategies that does not suffer from the deficiencies above.

SUMMARY OF THE INVENTION

The invention provides a method, system, and program product for increasing the effectiveness of a customer contact strategy. In one embodiment, the method includes assigning a value to each of a plurality of customer events; assigning each of the plurality of promotion events to a "bucket" having a predefined range of values, based on a value of each promotion event; and selecting a customer event from the bucket having the highest range of values.

A first aspect of the invention provides a method of increasing the effectiveness of a customer contact strategy, the method comprising: assigning a value to each of a plurality of customer events; assigning each of the plurality of customer events to a bucket having a predefined range of values, based on the assigned value of each customer event; and selecting a customer event from the bucket having the highest range of values.

A second aspect of the invention provides a system for increasing the effectiveness of a customer contact strategy, the system comprising: a system for assigning a value to each of a plurality of customer events; a system for assigning each of the plurality of customer events to a bucket having a predefined range of values, based on the assigned value of each customer event; and a system for selecting a customer event from the bucket having the highest range of values.

A third aspect of the invention provides a program product stored on a computer-readable medium, which when executed, increases the efficiency of a customer contact strategy, the program product comprising: program code for assigning a value to each of a plurality of customer events; program code for assigning each of a plurality of customer events to a bucket having a predefined range of values based on a value of each customer event; and program code for selecting a customer event from the bucket having the highest range of values.

A fourth aspect of the invention provides a method for deploying an application for increasing the effectiveness of a customer contact strategy, comprising: providing a computer infrastructure being operable to: assign a value to each of a plurality of customer events; assign each of the plurality of customer events to a bucket having a predefined range of values based on a value of each customer event; and select a customer event from the bucket having the highest range of values.

A fifth aspect of the invention provides computer software embodied in a propagated signal for increasing the efficiency of a customer contact strategy, the computer software comprising instructions to cause a computer system to perform the following functions: assign a value to each of a plurality of customer events; assign each of the plurality of customer events to a bucket having a predefined range of values, based on the assigned value of each customer event; and select a customer event from the bucket having the highest range of values.

A sixth aspect of the invention provides a business method for increasing the efficiency of a customer contact strategy.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 1 shows a prior art horizontal marketing matrix.

FIG. 2 shows a prior art cannibalization matrix.

FIG. 3 shows a prior art saturation matrix.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for increasing the effectiveness of customer contact strategies. More particularly, the invention provides, inter alia, a method of ensuring that the most valuable customer event is selected. Unlike known methods, the invention does not require recalculation of the values of remaining customer events. This is accomplished by "bucketing" customer events based on their values. A customer event is assigned to a "bucket" having a predefined range of values within which the customer event value falls. Buckets may then be accessed according to their predefined value ranges and a customer event selected from a non-empty bucket having the highest range of values.

The valuation method of the present invention includes the calculation of a payoff ratio of a customer event. The payoff ratio is simply the estimated payback value of a customer event divided by the cost of applying the customer event. This can be expressed as:

$$V[c,e]=P[c,e]/C[e],$$

where $V[c,e]$ is the value of the customer event, e, as applied to a customer, c, $P[c,e]$ is the payback value of the customer event for customer c, and $C[e]$ is the cost of the promotion event. Such a valuation method permits meaningful comparisons of the values of different customer events for the same customer, the same promotion event for different customers, and different promotion events for different customers. In addition, saturation effect can be measured relative to the payoff ratio in the same way it is applied to values used by Bibelnieks et al., described above.

Figure 4:
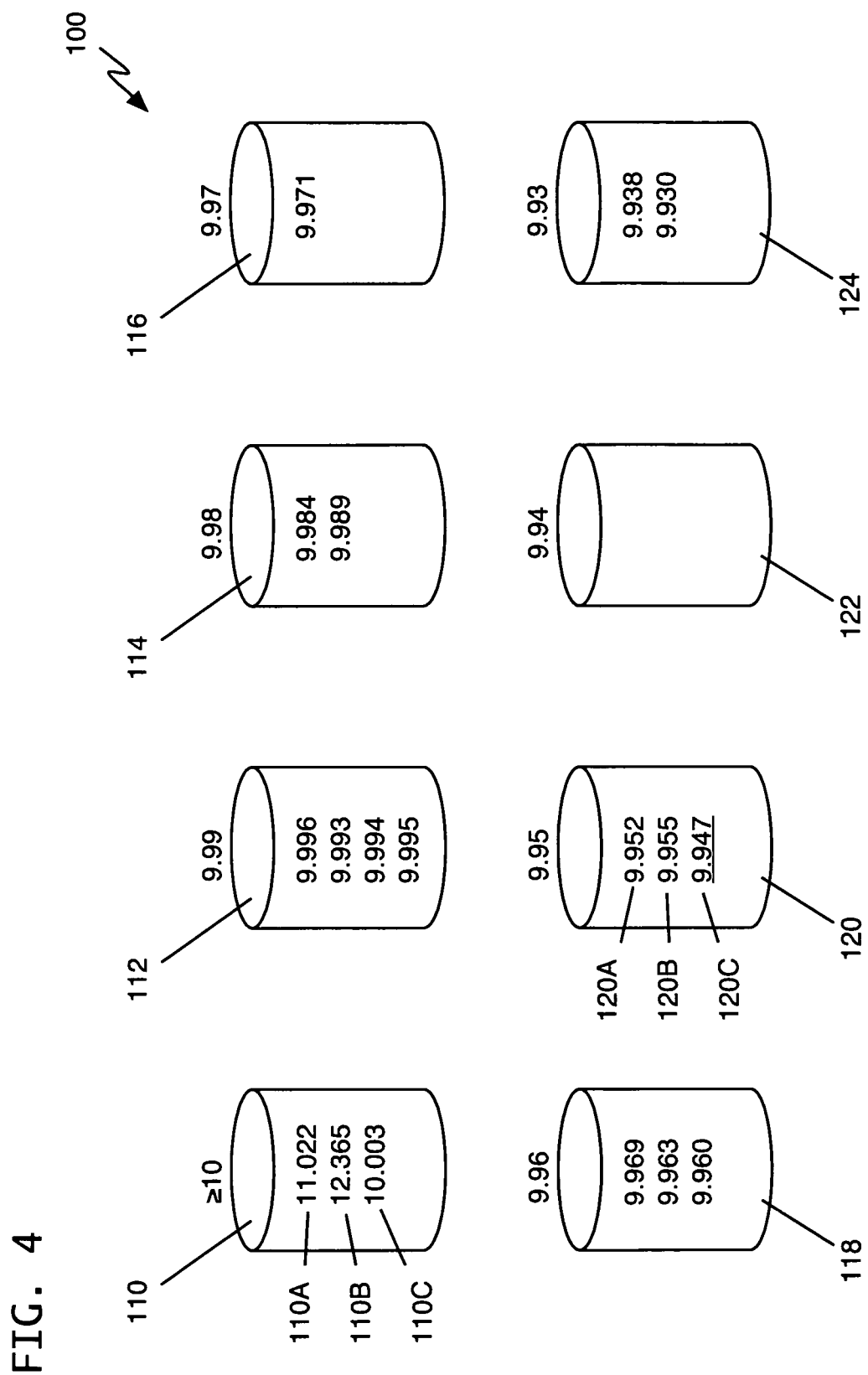
FIGS. 4-5 show illustrative collections of customer event buckets according to embodiments of the invention.

For example, FIG. 4 shows a collection 100 of buckets 110-124. Each bucket is assigned a value corresponding to the values of the customer events it is to contain. For example, bucket 114 has a value of 9.98, meaning that customer events placed in bucket 114 must have a value of at least 9.98, but not higher than the bucket with the next-highest value (i.e., bucket 112, which has a value of 9.99). Thus, bucket 114 may contain customer events with values between 9.990 and 9.999. The "widths" of the buckets (i.e., the value ranges they may contain) may be narrower or broader than those of FIG. 4, depending, for example, on the number of customer events to be "bucketed" and the degree of refinement in event selection that is desired. For example, if only a few customer events will be bucketed, buckets having values of, for example, "9," "8," "7," etc., may be sufficient.

Where the width of the buckets is sufficiently narrow, an additional benefit of the invention is that the customer events within individual buckets need not be sorted according to their values. For example, as shown in FIG. 4, within bucket 114, whether the customer event having a value of 9.984 is selected before the customer event with a value of 9.989 is of little consequence, given the small difference in their values. Such a difference is likely to be less than the imprecision inherent in the modeling and valuation processes that led to the values assigned to each customer event. While not having to sort customer events provides a great computational savings, it is possible, of course, and within the scope of the invention, to perform such a sorting. It should be noted that while the customer events contained in the buckets of FIG. 4 are identified only by their values (i.e., payoff ratios), other or additional identifiers may be similarly employed.

Collection 100 may optionally contain a separate bucket 110 for customer events having values above a particular threshold. As shown, bucket 110 has a value of ≥10. Thus, any customer event with a value of 10 or greater will be added to bucket 110. The rationale is that any customer event having a value greater than or equal to the particular threshold will be selected, regardless of any other customer events selected. Again, the customer events in bucket 110 need not be sorted. In fact, if each customer event in bucket 110 is to be selected, it is normally of little importance in what order they are selected.

Typically, then, customer events will be selected first from bucket 110 and then from each remaining bucket, in decreasing value. That is, once bucket 110 is empty, customer events will be selected from bucket 112 until it is empty, then from bucket 114 until it is empty, and so on.

Optionally, the selection process may include a verification step, wherein the customer event's placement in the current bucket is verified as correct. This is simply a matter of comparing the customer event's value to the range of values acceptable within the bucket. For example, as shown in FIG. 4, although bucket 120 has a value range of 9.950 through 9.959, only two of its three customer events fall within this range, i.e., 120A (9.952) and 120B (9.955). Customer event 120C has a value of 9.947 and should, therefore, have been placed in bucket 122. Initially, all customer events will be correctly bucketed. As will be explained below, however, the selection of one customer event may change the value (i.e., payoff ratio) of another customer event (e.g., by changing the saturation effect). In some cases, this change in valuation may be enough to cause the affected customer event to be improperly bucketed.

Accordingly, if the selection process includes a verification step, customer event 120C will be "demoted" to bucket 122. Of course, it is also possible that an improperly placed customer event will be "promoted" to the proper bucket. In such a case, in order to continue selecting customer events having the greatest value, selections from the current bucket will cease and the rebucketed customer event will be selected from its proper bucket. Deferring such "rebucketing" until the customer event is to be selected considerably reduces the number of times a customer event needs to be rebucketed. Indeed, many customer events having a low value even prior to devaluation by, for example, saturation effect, may never have to be rebucketed at all, as budgetary or other constraints may prohibit selection of customer events having a value below a particular threshold. Accordingly, the deferred rebucketing of the present invention considerably enhances the overall performance of a customer contact method.

In addition, it is possible that, with respect to a particular customer, the value of a first customer event increases as a result of selecting a second customer event. This would be represented by values greater than 1 in the saturation matrix of FIG. 3. The value of the first customer event may be increased to such a degree that the bucket to which it properly belongs will change. In such a case, it is preferable that such rebucketing occur immediately upon the revaluation of the first customer event rather than deferring such rebucketing until the first customer event is to be selected.

Figure 5:
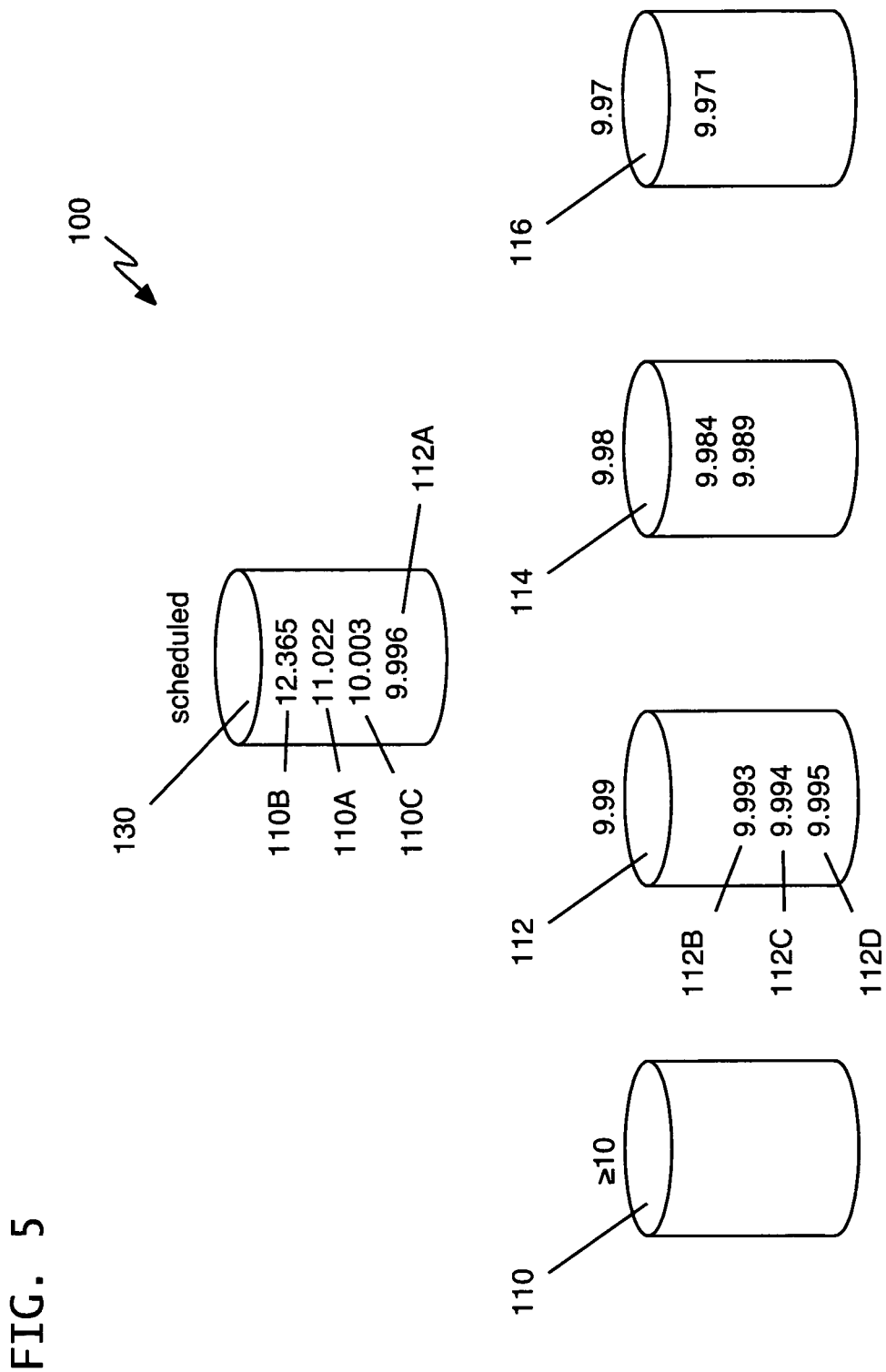

Referring now to FIG. 5, collection 100 may further include a bucket 130 of selected customer events. For example, as shown in FIG. 5, all three customer events from bucket 110 (i.e., 110A-C) and the first customer event from bucket 112 (i.e., 112A) have been selected and moved to bucket 130. Preferably, customer events are maintained in bucket 130 in an order according to their respective values. Optionally, customer events in bucket 130 may be sorted according to their values, as shown. When sorting of bucket 130 is employed, it is preferable to utilize a fine sorting algorithm that takes advantage of the fact that bucket 130 is likely to be at least partially sorted already. Such sorting may be in place of or in addition to the sorting of individual buckets, as described above. Once moved to bucket 130, customer events will be scheduled and enacted by other customer contact systems, as are known in the art.

Figure 6A:
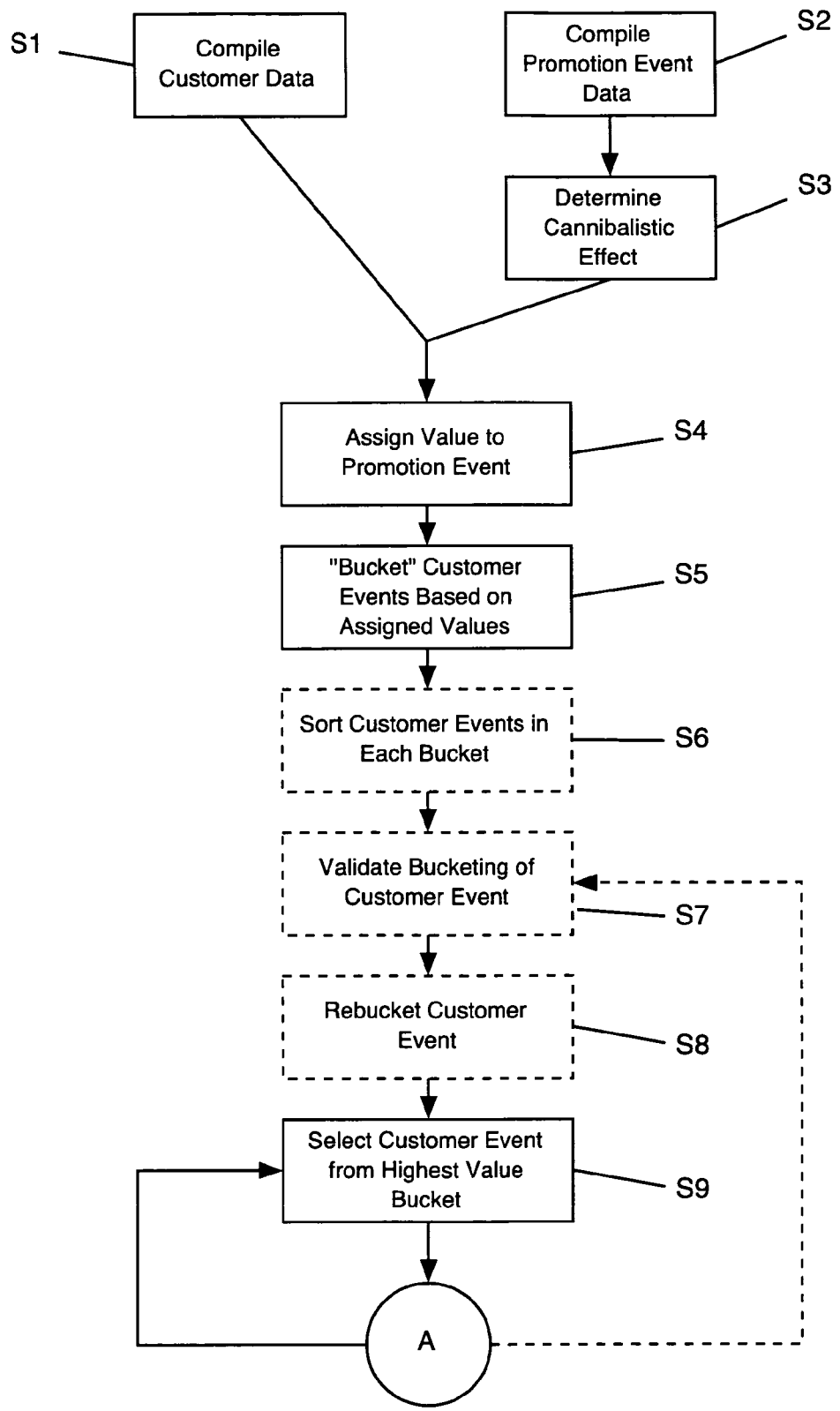
FIGS. 6A-B show a block diagram of an illustrative method according to an embodiment of the invention.
Figure 6B:
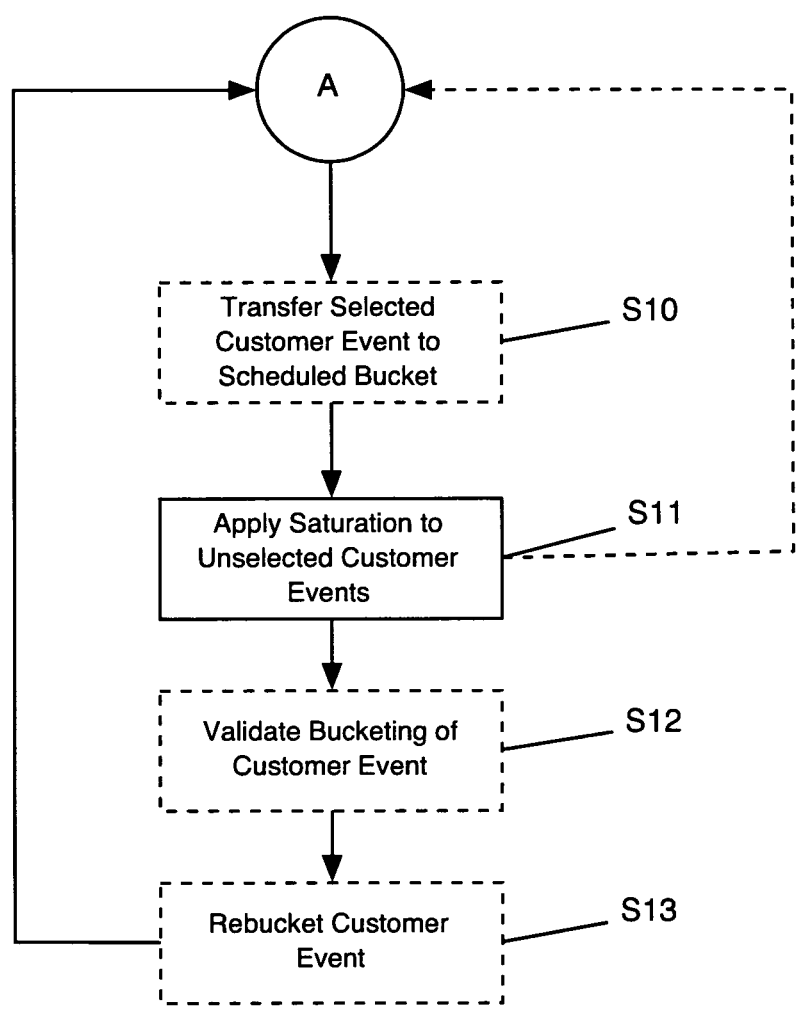

FIGS. 6A-B show block diagrams of an illustrative method according to the invention. Referring first to FIG. 6A, at step S1, data related to a plurality of customers or groups of customers is compiled. Such data may include, for example, past purchasing histories, totals of past purchases, length of time as a customer, etc. Next, at step S2, data related to a plurality of promotion events is compiled. Such data may include, for example, the date of the promotion event, its medium (e.g., telemarketing, direct mail, etc.), its terms and/or incentives, its cost, etc. Based on the data compiled at step S2, the cannibalistic effects of each promotion event on all other promotion events is determined. It should be recognized that steps S2 and S3 may be performed before, concurrent with, or after performance of step S1.

At step S4, a value is assigned to each promotion event relative to each customer or customer group in step S1, and is referred to as a customer event from this point forward. As noted above, the valuation method of the present invention includes the calculation of a payoff ratio comprising the payback value of the customer event divided by the cost of the customer event. At step S5, customer events are "bucketed" according to the values assigned at step S4.

Optionally, at step S6, the customer events in each bucket are sorted according to their assigned values. At step S9, a customer event is selected from the highest value bucket containing a customer event. However, prior to such selection, the customer event may be validated at optional step S7 to ensure that it has been properly bucketed. In the case that the customer event has been improperly bucketed, the customer event may be rebucketed at step S8.

Referring now to FIG. 6B, at optional step S10, the selected customer event may be transferred to a bucket of selected customer events. Next, at step S11, saturation is applied to unselected customer events, as described above.

In the case that optional steps S7 and S8 (FIG. 6A) are not performed, the bucketing of customer events may be validated at step S12 and, if necessary, improperly bucketed customer events may be rebucketed at step S13. In either case (e.g., either steps S7 and S8 are performed or steps S12 and S13 are performed), steps of the method of FIGS. 6A-B may be looped to perform selected steps iteratively. For example, as shown in FIGS. 6A-B, in the case that steps S7 and S8 are performed, steps S7 through S11 may be iteratively looped. Alternatively, in the case that steps S7 and S8 are not performed, steps S9 through S13 may be iteratively looped. As can be seen, it is unnecessary to perform steps S7 and S8 as well as steps S12 and S13. However, in the case that steps of the method are iteratively looped, either steps S7 and S8 or steps S12 and S13 should be performed. In a preferred embodiment, steps S7 and S8 are performed.

Steps S7 through S11 and/or S9 through S13 may be repeated for any number of iterations or until some target is reached. Such a target may include, for example, the selection of a predetermined number of customer events, accrual of a predetermined cost for all selected customer events, or the achievement of a predetermined cumulative payoff ratio for all selected customer events. Such predetermined values may be applied globally (i.e., applicable to all customer events), to a subset of customer events (e.g., applicable to a particular promotion event, as applied to all customers), or to a subset of customers or customer groups.

It should be recognized, of course, that fewer steps than those shown in FIG. 6 may be employed, in the case that one or more of steps S1-S4 have already been performed. For example, in the case that data related to customers and promotion events have already been compiled, a method according to the invention may include only steps S3-S5 and S9. Or, in the case that each of steps S1-S4 have already been completed by, for example, a separate customer contact system or using another customer contact method, a method according to the invention may include only steps S5 and S9. Of course, one or more of optional steps S6-S8 and S10 may also be included in such a method.

Figure 7:
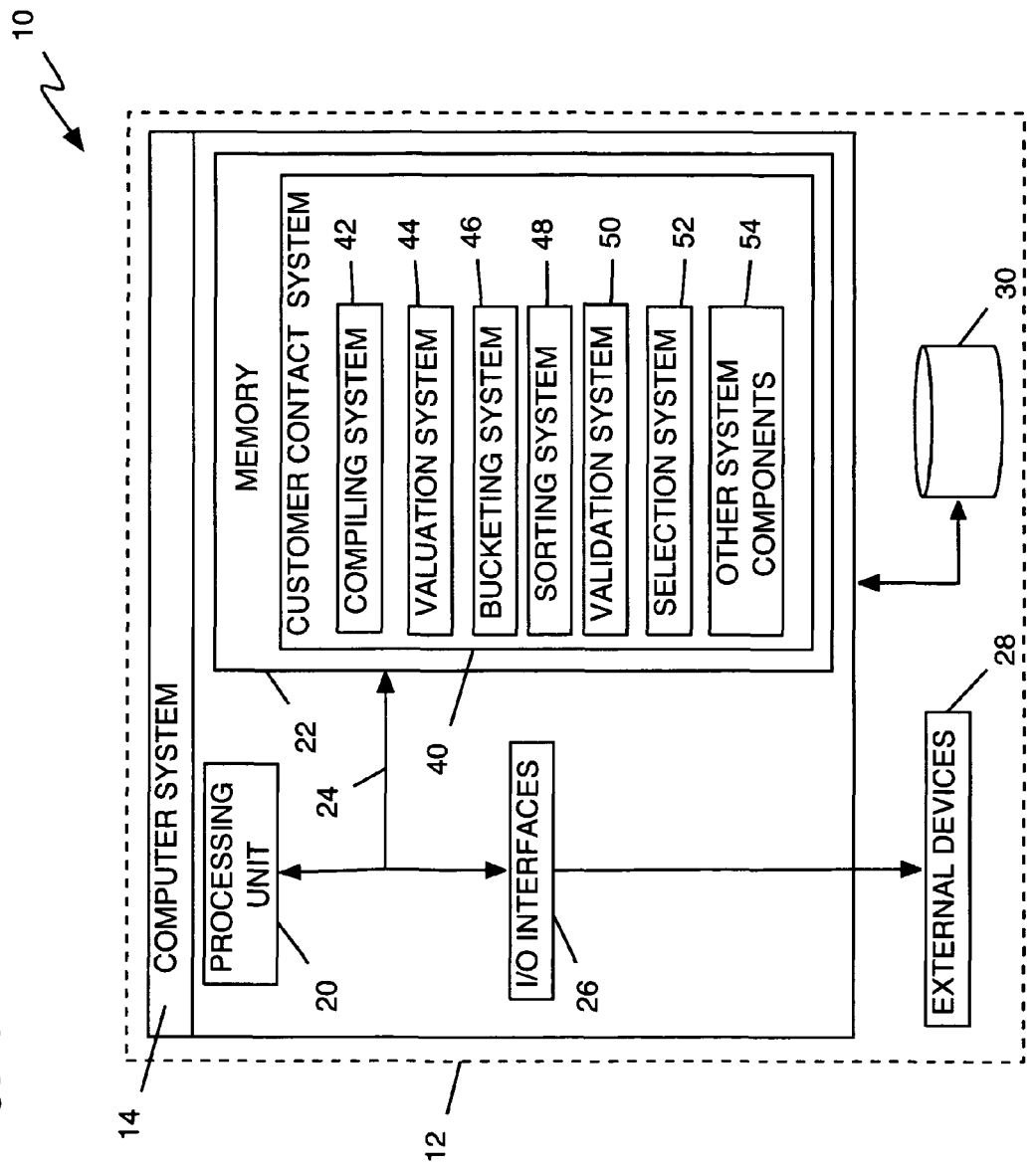
FIG. 7 shows an illustrative system according to an embodiment of the invention.

FIG. 7 shows an illustrative system 10 for increasing the effectiveness of a customer contact strategy. To this extent, system 10 includes a computer infrastructure 12 that can perform the various process steps described herein for increasing the effectiveness of a customer contact strategy. In particular, computer infrastructure 12 is shown including a computer system 14 that comprises a customer contact system 40, which enables computer system 14 to increase the effectiveness of a customer contact strategy by performing the process steps of the invention.

Computer system 14 is shown including a processing unit 20, a memory 22, an input/output (I/O) interface 26, and a bus 24. Further, computer system 14 is shown in communication with an external devices 28 and a storage system 30. As is known in the art, in general, processing unit 20 executes computer program code, such as customer contact system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and customer contact system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned and discussed further below, customer contact system 40 enables computer system 14 to increase the effectiveness of a customer contact strategy. To this extent, customer contact system 40 is shown including a compiling system 42, a valuation system 44, a bucketing system 46, a sorting system 48, a validation system 50, and a selection system 52. Operation of each of these systems is discussed above. Customer contact system 40 may further include other system components 54 to provide additional or improved functionality to customer contact system 40. It is understood that some of the various systems shown in FIG. 7 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for increasing the effectiveness of a customer contact strategy, it is understood that the invention further provides various alternative embodiments. For example, in one embodiment, the invention provides a computer-readable medium that includes computer program code to enable a computer infrastructure to increase the effectiveness of a customer contact strategy. To this extent, the computer-readable medium includes program code, such as customer contact system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to increase the effectiveness of a customer contact strategy as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for increasing the effectiveness of a customer contact strategy. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of increasing the effectiveness of a customer contact strategy, the method comprising:
   employing at least one computing device for:
   compiling data related to a plurality of customers;
   compiling data related to a plurality of promotion events;
   transforming the customer data and promotion event data into data representing a plurality of customer events;
   assigning a value to each of the plurality of customer events;
   assigning each of the plurality of customer events to a bucket having a predefined range of values, based on the assigned value of each customer event; and
   selecting a customer event from the bucket having the highest range of values.

2. The method of claim 1, further comprising:
   employing the at least one computing device for:
   sorting each of the plurality of customer events in a bucket based on the value of each customer event.

3. The method of claim 1, wherein assigning includes calculating a payoff ratio comprising a payback value of the customer event divided by a cost of the customer event.

4. The method of claim 1, further comprising:
   employing the at least one computing device for:
   applying a saturation effect to at least one unselected customer event.

5. The method of claim 4, further comprising:
   employing the at least one computing device for:
   validating the assignment of at least one customer event; and
   in the case that the assignment of the at least one customer event is invalid, rebucketing the at least one customer event.

6. The method of claim 1, wherein each of the steps is repeated until a target is reached, the target being selected from a group consisting of: selection of a predetermined number of customer events, accrual of a predetermined cost for all selected customer events, and achievement of a predetermined cumulative payoff ratio for all selected customer events.

7. The method of claim 1, further comprising:
   employing the at least one computing device for:
   transferring the selected customer event to a bucket of selected customer events.

8. A system for increasing the effectiveness of a customer contact strategy, the system comprising:
   at least one computing device;
   a system for assigning a value to each of a plurality of customer events;
   a system for assigning each of the plurality of customer events to a bucket having a predefined range of values, based on the assigned value of each customer event; and
   a system for selecting a customer event from the bucket having the highest range of values.

9. The system of claim 8, further comprising:
   a system for sorting each of the plurality of customer events in a bucket based on the value of each customer event.

10. The system of claim 8, wherein the system for assigning a value includes means for calculating a payoff ratio comprising a payback value of the customer event divided by a cost of the customer event.

11. The system of claim 8, further comprising:
    a system for compiling data related to a plurality of customers;
    a system for compiling data related to a plurality of promotion events; and
    a system for assigning a value to each of the plurality of promotion events.

12. The system of claim 11, further comprising:
    a system for determining a cannibalistic effect of at least one promotion event on at least one other promotion event.

13. The system of claim 8, further comprising:
    a system for validating the assignment of at least one customer event, and, in the case that the assignment of the at least one customer event is invalid, rebucketing the at least one customer event.

14. The system of claim 8, further comprising:
    a system for transferring the selected customer event to a bucket of selected customer events.

15. A non-transitory computer-readable storage medium including a program product, which when executed, increases the efficiency of a customer contact strategy, the program product comprising:
    program code for assigning a value to each of a plurality of customer events;

program code for assigning each of a plurality of customer events to a bucket having a predefined range of values based on a value of each customer event; and program code for selecting a customer event from the bucket having the highest range of values.

16. The non-transitory computer-readable storage medium of claim 15, further comprising:

program code for sorting each of the plurality of customer events in a bucket based on the value of each customer event.

17. The non-transitory computer-readable storage medium of claim 15, wherein the program code for assigning a value includes program code for calculating a payoff ratio comprising a payback value of the customer event divided by a cost of the customer event.

18. The non-transitory computer-readable storage medium of claim 15, further comprising:

program code for validating the assignment of at least one customer event, and, in the case that the assignment of the at least one customer event is invalid, rebucketing the at least one customer event.

19. The non-transitory computer-readable storage medium of claim 15, further comprising:

program code for compiling data related to a plurality of customers;

program code for compiling data related to a plurality of promotion events, including program code for determining a cannibalistic effect of at least one promotion event on at least one other promotion event; and program code for assigning a value to each of the plurality of promotion events.

20. The non-transitory computer-readable storage medium of claim 15, further comprising:

program code for transferring the selected customer event to a bucket of selected customer events.

21. A method for deploying an application for increasing the effectiveness of a customer contact strategy, comprising:

providing a computer infrastructure including at least one computing device, the at least one computing device being configured to:

assign a value to each of a plurality of customer events;

assign each of the plurality of customer events to a bucket having a predefined range of values based on a value of each customer event; and select a customer event from the bucket having the highest range of values.

* * * * *